(12) United States Patent
Richter et al.

(10) Patent No.: US 7,339,579 B2
(45) Date of Patent: Mar. 4, 2008

(54) WIRING HARNESS AND TOUCH SENSOR INCORPORATING SAME

(75) Inventors: Paul J. Richter, Chelmsford, MA (US); Darran R. Cairns, Billerica, MA (US); Frank J. Bottari, Acton, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 743 days.

(21) Appl. No.: 10/736,388

(22) Filed: Dec. 15, 2003

(65) Prior Publication Data

US 2005/0126831 A1    Jun. 16, 2005

(51) Int. Cl.
*G06F 3/041* (2006.01)

(52) U.S. Cl. ............ 345/173; 345/174; 178/18.01

(58) Field of Classification Search .............. 345/173, 345/174, 179; 178/18.01, 18.03, 18.05, 19.01, 178/19.03, 19.04; 200/5 A
See application file for complete search history.

(56) References Cited

U.S. PATENT DOCUMENTS

| | | | |
|---|---|---|---|
| 4,198,539 A | 4/1980 | Pepper, Jr. | |
| 4,293,734 A | 10/1981 | Pepper, Jr. | |
| 4,371,746 A | 2/1983 | Pepper, Jr. | |
| 4,822,957 A | 4/1989 | Talmage, Jr. et al. | |
| 5,457,289 A * | 10/1995 | Huang et al. | 178/18.08 |
| 5,650,597 A | 7/1997 | Redmayne | |
| 5,886,687 A | 3/1999 | Gibson | |
| 6,305,073 B1 | 10/2001 | Badders, Jr. | |
| 6,549,193 B1 | 4/2003 | Huang et al. | |
| 6,812,974 B1 * | 11/2004 | Hinata et al. | 349/12 |
| 2001/0028343 A1 | 10/2001 | Bottari et al. | |
| 2001/0036504 A1 | 11/2001 | Bottari et al. | |
| 2002/0190961 A1 | 12/2002 | Chen | |
| 2003/0067447 A1 * | 4/2003 | Geaghan et al. | 345/173 |
| 2004/0125087 A1 * | 7/2004 | Taylor et al. | 345/173 |

FOREIGN PATENT DOCUMENTS

| | | |
|---|---|---|
| EP | 1 172 831 A2 | 1/2002 |
| GB | 2 373 581 | 9/2002 |
| JP | 5-324203 | 12/1993 |
| WO | WO 96/15464 | 5/1996 |
| WO | WO 02/084876 | 10/2002 |

* cited by examiner

*Primary Examiner*—Richard Hjerpe
*Assistant Examiner*—Kimnhung Nguyen
(74) *Attorney, Agent, or Firm*—Robert S. Moshrefzaden

(57) ABSTRACT

A wiring harness and a touch sensor incorporating same are disclosed. The touch sensor includes a sensing electrode disposed in a touch sensitive area. The touch sensor further includes a plurality of auxiliary electrodes disposed on a self-supporting dielectric substrate in a border area. The auxiliary electrodes transmit a touch signal to electronics configured to use the touch signal to determine the touch location.

36 Claims, 6 Drawing Sheets

WIRING HARNESS AND TOUCH SENSOR INCORPORATING SAME

RELATED APPLICATIONS

This application is related to application Ser. No. 10/679,903 filed Oct. 6, 2003 entitled TOUCH INPUT SENSING DEVICE.

FIELD OF THE INVENTION

This invention generally relates to sensing devices. The invention is particularly applicable to touch sensors having a wiring harness integral to the touch panel.

BACKGROUND

Touch screens allow a user to conveniently interface with an electronic display system by reducing or eliminating the need for a keyboard. For example, a user can carry out a complicated sequence of instructions by simply touching the screen at a location identified by a pre-programmed icon. The on-screen menu may be changed by re-programming the supporting software according to the application. As another example, a touch screen may allow a user to transfer text or drawings to an electronic display device by directly writing or drawing onto the touch screen.

Resistive and capacitive are two common touch sensing methods employed to detect the location of a touch input. Resistive technology typically incorporates two transparent conductive films as part of an electronic circuit that detects the location of a touch. Capacitive technology, on the other hand, typically uses a single transparent conductive film to detect the location of an applied touch.

A touch sensor generally includes a touch panel and an electronics circuitry for detecting a touch signal generated in response to a touch input applied to the touch panel. The electronics circuitry uses the detected touch signal to determine the location of the applied touch. Generally, multiple individual wires, each external to the touch panel, are used to electrically connect the touch panel to the electronics circuitry. Connecting individual wires to the touch panel is labor intensive, usually done by hand, and connections are often unreliable and can damage the panel, even rendering it inoperative.

SUMMARY OF THE INVENTION

Generally, the present invention relates to wiring harnesses. The present invention also relates to sensing devices incorporating wiring harnesses.

In one aspect of the invention, a touch sensor includes a sensor substrate that covers a touch sensitive area. The touch sensitive area is configured to receive a touch input applied to the touch sensitive area from a front side of the touch sensor. The touch sensor further includes a sensing electrode that is disposed on the sensor substrate in the touch sensitive area. The touch sensor further includes a self-supporting dielectric substrate that covers a border area. The border area is outside the touch sensitive area. The dielectric substrate is disposed between the sensing electrode and the front side of the touch sensor. The touch sensor further includes a plurality of auxiliary electrodes that are disposed on the self-supporting dielectric substrate in the border area. The touch sensor generates a touch signal in the sensing electrode in response to the touch input applied to the touch sensitive area from the front side of the touch sensor. The auxiliary electrodes transmit the touch signal to electronics. The electronics are configured to use the touch signal to determine the touch location.

In another aspect of the invention, a capacitive touch sensor includes a sensor substrate that covers a touch sensitive area. The touch sensitive area is configured to receive a touch input applied to the touch sensitive area. The touch sensor further includes a sensing electrode that is disposed on the sensor substrate in the touch sensitive area. The touch sensor further includes a self-supporting dielectric substrate that covers a border area. The border area is outside the touch sensitive area. The touch sensor further includes a plurality of auxiliary electrodes that are disposed on the dielectric substrate in the border area. The touch sensor generates a touch signal in response to a capacitive coupling between the touch sensor and the touch input applied to the touch sensitive area. The auxiliary electrodes transmit the touch signal to electronics. The electronics are configured to use the touch signal to determine the touch location.

BRIEF DESCRIPTION OF DRAWINGS

The invention may be more completely understood and appreciated in consideration of the following detailed description of various embodiments of the invention in connection with the accompanying drawings, in which.

Figure 1:
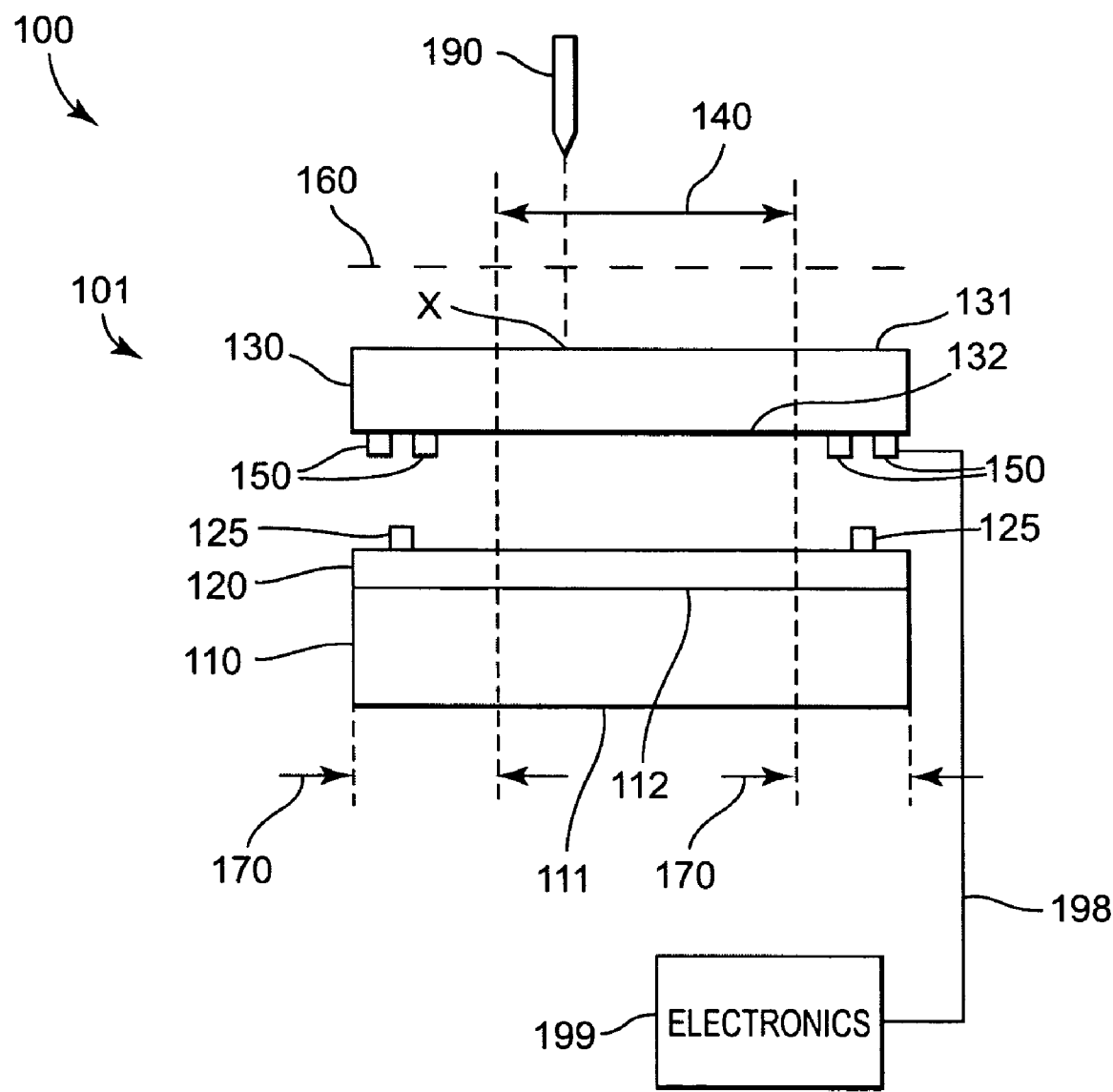
FIG. 1 illustrates a schematic side view of a touch sensor in accordance with one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention generally relates to touch sensors. The invention is particularly applicable to touch sensors having an integral wiring harness, and even more particularly to capacitive and resistive touch sensors having an integral wiring harness.

A touch screen functions on the general principle that an otherwise open electrical circuit is closed when a touch is applied. The properties of a signal generated in the closed circuit allows detection of a touch location. Various technologies may be employed to detect a touch location. One such technology is resistive. In a resistive touch, an applied touch brings two otherwise physically separated conductive films into direct physical contact with one another. The physical contact closes an otherwise open electronic circuit, thereby resulting in generation of a resistively coupled electrical signal. The properties of the generated signal allow detection of the touch location.

Capacitive is a technology commonly used to detect the location of a touch input. In this case, a signal is generated when a conductive touch implement, such as a user's finger, is brought sufficiently close to a conductive film to allow capacitive coupling between the two conductors. The two conductors can be electrically connected to each other, for example, through the earth ground.

A touch sensor may be digital or analog. The touch sensitive area of a digital sensor typically includes a plurality of discrete electrically isolated conductive films. For example, the touch sensitive area may include a set of discrete touch pads. As another example, the touch sensitive area can include a plurality of electrically isolated parallel rows or columns of conductive films. In a digital touch sensor, the coordinates of a touch input can be determined by using discrete, or equivalently distinct, signals induced by the touch. In an analog touch sensor, the touch sensitive area is typically covered by an electrically continuous conductive film. In such a case, the signal induced by a touch input can include a signal that can assume a non-discrete, or equivalently, any one of a continuous set of possible values. In an analog touch sensor, the coordinates of a touch input can be determined by detecting and using the continuous signal induced by the touch. The accuracy of determining the touch location can be limited by the electronics used to process the induced signal.

Touch sensors typically use multiple external electrically insulated wires, often four wires, to transmit a touch induced signal from multiple pick-up locations on a touch panel to an electronics circuitry for processing the touch signal. Typically, each external wire extends along and around the edges of the touch panel. The electrical connection between the external wires and the pick-up locations is often accomplished by hand soldering the wires to the touch panel at the pick-up locations. As such, the process can be quite labor intensive, and therefore, expensive. Soldering can result in high profile solder bumps, thus adversely affecting the overall profile of the touch panel. Solder bumps can be susceptible to damage from, for example, contact with other components or during processing and assembly, thereby compromising the accuracy of touch location. Furthermore, a soldered connection can break at the joint, or otherwise electrically fail, if, for example, the soldered external wire is accidentally pulled, for example, during processing. In addition, soldering temperature can easily exceed 150° C. A high temperature can damage nearby components, such as conductive coatings, and various optical layers such as a substrate, or an anti-glare or anti-Newton-ring coating.

It is generally desirable that a wire harness be protected from electrical noise or other signals that may interfere with determining a touch location. Such a protection is generally provided by placing a dielectric tape on the wire along the edges of the touch panel. The tape is often manually placed in position and gives the touch panel an unfinished look. Furthermore, the taping process can be labor intensive, and therefore, expensive.

Touch panels having integral wiring traces are disclosed, for example, in U.S. Patent Application Nos. 2001/0028343 and 2001/0036504.

The present invention describes a touch sensor that includes an integral wiring harness, where by integral it is meant that the wiring harness is formed on one or more components or layers in the touch panel. The wiring harness is formed, for example, on a dielectric substrate by, for example, screen printing a conductive ink in a desired pattern along and around the edges of the touch panel. As such, the present invention eliminates or reduces the need for soldering wiring harness to a touch sensor. As a result, the present invention can reduce the number of, or eliminate altogether, solder bumps in a touch panel.

Furthermore, according to one embodiment of the invention, an integral wiring harness is disposed between layers of a touch panel, making the harness invisible or less visible. The wiring harness can also be formed on a substrate that does not include a resistive layer so that forming the wiring harness does not damage the resistive layer.

In one embodiment of the present invention, an integral wiring harness is disposed between an electrically conductive layer and the front side of a touch sensor. According to another embodiment of the invention, a wiring harness is formed on a self-supporting dielectric layer that is disposed within a touch panel.

FIG. 1 illustrates a schematic side view of a touch sensor 100 in accordance with one particular embodiment of the invention. Touch sensor 100 includes a sensor substrate 110, a sensing electrode 120 disposed on the sensor substrate, a self-supporting dielectric substrate 130, and a plurality of auxiliary electrodes 150 disposed on the self-supporting dielectric substrate.

Sensor substrate 110 includes a first side 111 and a second side 112. Self-supporting dielectric substrate 130 includes a first side 131 and a second side 132.

Touch sensor 100 further includes a front side shown as a dashed line 160 in FIG. 1. By front side of the touch sensor, it is meant the side from which a touch input is applied to the touch sensor. For example, in FIG. 1, a touch applicator 190 is applied to the touch sensor 100 from side 160 and not, for example, from first side 111 of sensor substrate 110. Dashed line 160 is shown separate from first side 131 of the self-supporting dielectric substrate 130, although first side 131 may, in some embodiments of the invention, be coincident with front side 160 of the touch panel. Other components, substrates and layers can be disposed between front side 160 of the touch sensor and self-supporting dielectric substrate 130. Examples include hard coat, anti-reflection coating, anti-smudge coating, electrically conductive coating, additional substrate, polarizer film, retarder film, and any other film or component that may suitably be used in a touch sensor.

Touch sensor 100 further includes a touch sensitive area 140. Area 140 is configured to receive a touch input (indicated by "X") from a touch implement 190 applied to the touch sensitive area from the front side 160 of the touch sensor. Furthermore, touch sensor 100 includes a border area 170 outside the touch sensitive area 140. According to one embodiment of the invention, border area 170 is not sensitive to an applied input touch, meaning that touch sensor 100 does not generate a touch signal in response to a touch input applied to the border area 170 from the front side of the touch panel. In some embodiments, some or all of border area 170 may be sensitive to a touch input applied from, for example, another side of the touch sensor, such as the sensor substrate side 110 of the touch sensor.

Touch sensor 100 further includes a plurality of auxiliary electrodes 150 disposed on self-supporting dielectric substrate 130 in the border area 170. Auxiliary electrodes 150 are configured to receive signals generated from a touch input for transmission to electronics 199 via external electrode 198. For example, when touch sensor 100 generates a touch signal in sensing electrode 120 in response to a touch input applied from the front side 160 of the touch sensor to a location X in the touch sensitive area 160, the generated touch signal can be transmitted to electronics 199 which can use the touch signal to determine the touch location, X. The generated touch signal may be transmitted by the auxiliary electrodes 150 from multiple locations on the touch panel 101. For example, the generated touch signal may be transmitted from multiple locations, for example, four locations, on the sensing electrode 120. In a rectangular touch sensitive area 140, the four locations can, for example, be near the four corners of the touch sensitive area.

According to one embodiment of the invention, the self-supporting dielectric substrate 130 is flexible. The self-supporting dielectric substrate 130 may be made of glass or polymer. Exemplary polymeric materials include polycarbonate, acrylic, polyethylene terephthalate (PET), polyvinyl chloride (PVC), polysulfone, and the like. Exemplary glass materials include soda lime glass, borosilicate glass, borate glass, silicate glass, any oxide glass and silica glass. A polymeric substrate 130 can be much softer than a similar substrate made of glass, and therefore, more susceptible to scratches. For example, according to a pencil hardness test (see ASTM D 3363, Test Method for Film Hardness by Pencil Test) PET has a pencil hardness of about 1 H, whereas glass has a much higher hardness of about 6 H.

Self-supporting dielectric substrate 130 is preferably flexible, meaning that substrate 130 is sufficiently thin that it can be bent without structurally damaging the layer. In some applications, however, dielectric substrate 130 may be rigid. A glass self-supporting dielectric substrate 130 is preferably thin enough to be capable of bending to a radius of curvature ranging from 1500 to 600 mm, and more preferably to a range from 1400 to 500 mm, and even more preferably to a range from 1200 to 400 mm. In one aspect of the invention, a glass self-supporting dielectric substrate 130 has a thickness preferably in the range from 0.1 to 2.0 mm, and more preferably in the range from 0.3 to 1.5 mm, and even more preferably in the range from 0.5 to 1.0 mm.

Different embodiments of the current invention can be utilized in applications where it may be desirable to protect one or more layers in a touch sensor or a touch display system from abrasions, scratches, environmental factors such as moisture and oxygen, or any other extraneous factor.

The sensing electrode 120 can be a metal, semiconductor, doped semiconductor, semi-metal, metal oxide, an organic conductor, a conductive polymer, and the like. Exemplary metal conductors include gold, copper, silver, and the like. Exemplary inorganic materials include transparent conductive oxides, for example indium tin oxide (ITO), fluorine doped tin oxide, tin antimony oxide (TAO), and the like. Exemplary organic materials include conductive polymers such as polypyrrole, polyaniline, polyacetylene, and polythiophene, such as those disclosed in European Patent Publication EP-1-172-831-A2 . The sheet resistance of sensing electrode 120 can be in the range from 50 to 100,000 Ohms/square. The sheet resistance of the sensing electrode 120 is preferably in the range from 50 to 50,000 Ohms/square, and more preferably in the range from 50 to 10,000 Ohms/Square, and even more preferably in the range from 50 to 4,000 Ohms/Square.

Sensing electrode 120 preferably covers the touch sensitive area 140. In some applications, electrode 120 can cover a portion of the touch sensitive area. In some other applications, electrode 120 can cover more than the touch sensitive area as illustrated in FIG. 1. In yet some other applications, film 120 can cover a portion of the touch sensitive area and extend, at least partially, into areas not sensitive to touch, such as border area 170.

A glass self-supporting dielectric substrate 130 can be sufficiently thin to allow detection of a signal generated by, for example, capacitive coupling between a conductive touch implement 190 and the sensing electrode 120. At the same time, a glass self-supporting dielectric substrate 130 can be thick enough to make substrate 130 self-supporting and processable. Furthermore, a glass self-supporting dielectric substrate 130 can be thick enough to protect sensing electrode 120 from damage, such as a deep scratch in the glass substrate, which may result from a user's fingernail, a coin, a pen, or any sharp touch input applied to the touch sensitive area 140.

Known wiring harnesses are typically electrically connected to a touch panel by soldering. A soldering process can result in high profile soldering bumps, bent wires, and insufficient or excessive solder at a soldered joint. According to the present invention, the need for or damage resulting from soldering can be reduced or eliminated, by employing wiring harness integral to touch panel 101 in the form of auxiliary electrodes 150.

Auxiliary electrodes 150 can be optically opaque, semi-transparent, or nearly transparent. Auxiliary electrodes 150 can be metal such as silver, gold, copper, aluminum, lead, and the like, or a combination of metals. Auxiliary electrodes 150 can include carbon or other additives to make the electrodes conductive or more conductive. Auxiliary electrodes 150 can be formed onto self-supporting dielectric substrate 130 using ink jet printing, screen printing, shadow coating or any other suitable method for forming the electrodes onto substrate 130. Auxiliary electrodes 150 can be patterned using photolithography, ink jet printing, laser ablation, photo-bleaching, or any other suitable patterning method.

One or more of auxiliary electrodes 150 can be electrically connected to sensing electrode 120. The electrical connection can be, for example, resistive or capacitive.

FIG. 1 shows auxiliary electrodes 150 disposed on second side 132 of self-supporting dielectric substrate 130. Auxiliary electrodes 150 can be disposed on first side 131 of self-supporting dielectric substrate 130. In general, a portion of auxiliary electrodes 150 can be disposed on second side 132 of self-supporting dielectric substrate 130 and another portion can be disposed on first side 131 of self-supporting dielectric substrate 130.

According to one embodiment of the invention, auxiliary electrodes 150 are electrically connected to sensing electrode 120. The connection can be resistive or capacitive. For example, auxiliary electrodes 150 may be electrically connected to sensing electrodes 120 via a conductive ink, a conductive paste, or a z-axis adhesive (not shown in FIG. 1). Auxiliary electrodes 150 can be capacitively coupled to sensing electrode 120. In general, auxiliary electrodes 150 can be coupled to sensing electrode 120 using any method or technology that could allow a transmission of a touch signal generated in sensing electrode 120 to auxiliary electrode 150.

Self-supporting dielectric substrate 130 can be solid across the entire substrate as schematically shown in FIG. 1. Self-supporting dielectric substrate 130 can have one or more openings or apertures as schematically shown in FIG. 2.

Figure 2:
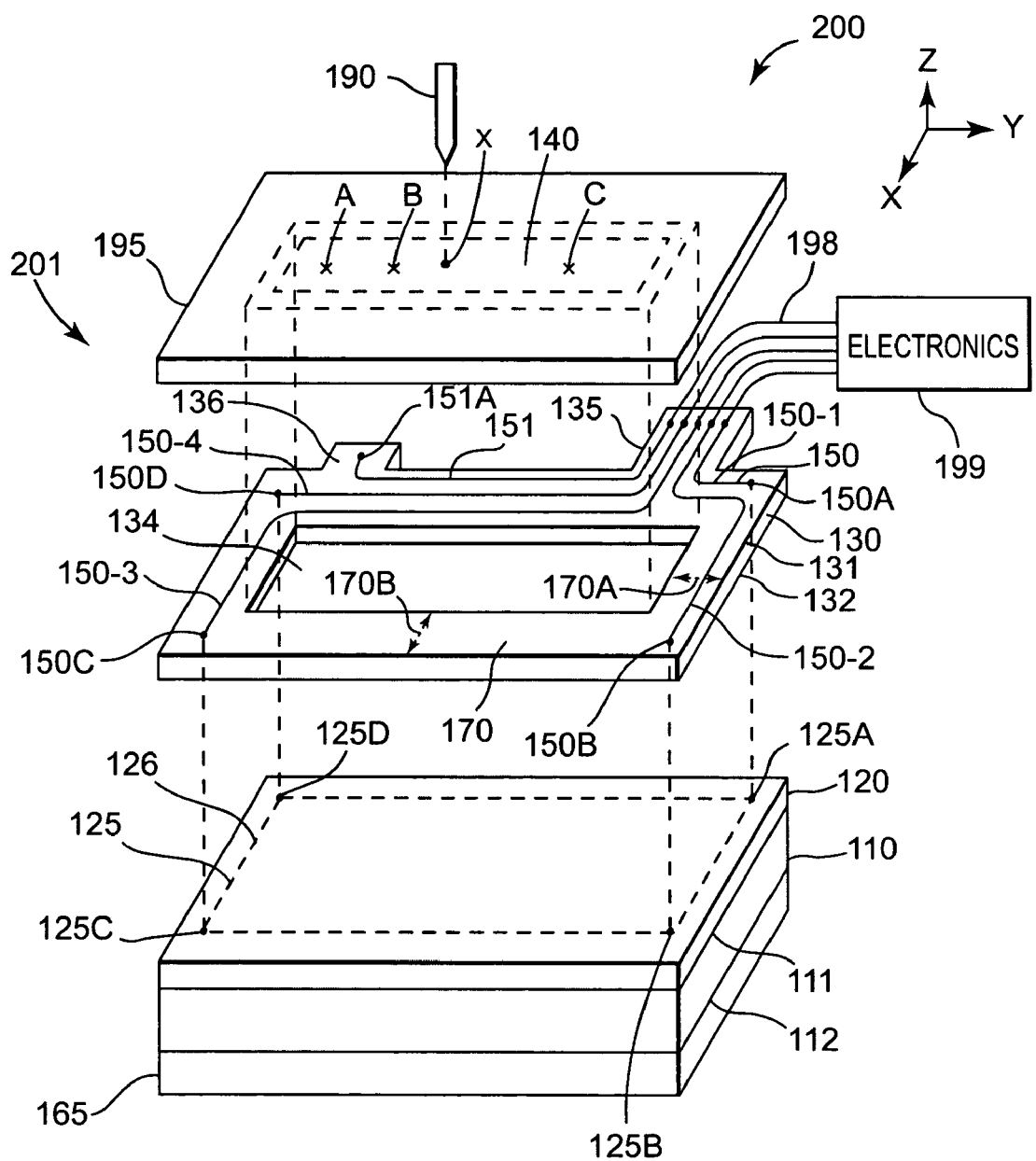
FIG. 2 illustrates a schematic three dimensional view of a touch sensor in accordance with another embodiment of the invention.

FIG. 2 illustrates a three-dimensional schematic view of a touch sensor 200 according to one particular embodiment of the present invention. In the specification, a same reference numeral used in multiple figures refers to similar elements having similar properties and functionalities. In particular, touch sensor 200 includes a sensor substrate 110 having a first side 111 and a second side 112, a sensing electrode 120 disposed on the sensor substrate, a cover layer 195, and a self-supporting dielectric substrate disposed between cover layer 195 and sensor substrate 110 and having a first side 131, a second side 132, and an open area 134. Sensor substrate 110 covers a touch sensitive area 140. Self-supporting dielectric substrate 130 covers a border area 170. Touch sensor 200 further includes a plurality of auxiliary electrodes 150 disposed on the first side 131 of dielectric substrate 130.

The open area 134 of the self-supporting dielectric substrate 130 includes one or more apertures or open space allowing passage through the dielectric substrate. Open area 134 and touch sensitive area 195 may or may not overlap each other. For example, open area 134 can extend touch sensitive area 195. As another example, open area 134 can be larger than the touch sensitive area 140 as shown in FIG. 2. Open area 134 can be smaller than and be covered by the touch sensitive area 140. In general, there may or may not be an overlap region between areas 140 and 134 in the xy-plane.

Touch sensor 200 further includes an optional electrically conductive shielding electrode 165, disposed on sensor substrate 110 opposite sensing electrode 120, for rejecting undesired signals, such as noise, received from a surrounding area. Shielding electrode 165 may be made of the same material used in sensing electrode 120, although shielding electrode 165 may have a different sheet resistance than sensing electrode 120. One or more of the auxiliary electrodes 150 may be electrically connected to shielding electrode 165.

FIG. 2 shows five auxiliary electrodes. Four auxiliary electrodes 150-1, 150-2, 150-3, and 150-4 terminate at locations 150A, 150B, 150C, and 150D respectively. The four termination points correspond to the four corners of the touch sensitive area 140 and sensing electrode 120 (locations 125A, 125B, 125C, and 125D). Applying a touch applicator 190 to the touch sensitive area 140 of the touch sensor can result in a touch signal being generated by the touch sensor. The touch signal can be generated in the sensing electrode 120. Auxiliary electrodes 150-1 through 150-4 can pick up the touch signal from locations 125A-125D on sensing electrode 120, respectively, and transmit the picked-up signals to electronics 199 via external electrodes 198. Electronics 199 can use the transmitted signals to determine the touch location. The remaining auxiliary electrode 151 terminates at location 151A and can be used to make electrical contact with shielding electrode 165. According to one embodiment of the invention, touch sensor 200 includes a plurality of auxiliary electrodes, some of which are used to transmit a touch signal to electronics 199, and some of which are used for other functions, such as shielding the touch sensor from noise or compensation for thermal drift.

Self-supporting dielectric substrate 170 can optionally have one or more protruding sections. A protruding section can, for example, be used to electrically connect one or more of the auxiliary electrodes 150 to the shielding electrode 165. As another example, a protruding section may be used to electrically connect one or more of the auxiliary electrodes 150 to the electronics 199. Referring to FIG. 2, self-supporting dielectric substrate 170 has a protruding tail section 135 and a protruding flap section 136. Tail section 135 can include termination points of auxiliary electrodes 150 and may be used to electrically connect or bond external electrodes 198 to auxiliary electrodes 150 by, for example, using a conventional electrical connector, soldering, or an electrically anisotropic conductive film. Flap section 136 may be used to electrically connect the external electrodes 198 to shielding electrode 165. For example, flap 136 can be folded around self-supporting dielectric substrate 130 and over shielding electrode 165, at which point, termination point 151A of auxiliary electrode 151 may be electrically connected to shielding electrode 165.

FIG. 2 shows a rectangular touch sensitive area 140, open area 134, and touch panel 201. In general, touch panel 201 can have any shape, such as a rectangle, a circle, an ellipse, or any other shape that may be desirable in a given application. Similarly, touch sensitive area 140 and open area 134 can have a shape other than a rectangle. Furthermore, the width of border area 170 along the y-axis, 170A, may be different than the width of the border area along the x-axis, 170B.

Touch sensor 200 can be a capacitive sensing device. In such a case, a conductive input touch applicator 190 applied to the touch sensor in the active area can induce a touch signal by capacitively coupling to the touch sensor. For example, the conductive input touch can capacitively couple to the sensing electrode 120. The induced touch signal can be generated, for example, in sensing electrode 120. Auxiliary electrodes 150 can pick up the touch signal from the four corners of the sensing electrode 120 and transmit the picked-up signals to electronics 199 via external electrodes 198. Electronics 199 can use the induced touch signal to determine the touch location.

Sensor substrate 110 can be electrically insulative or conductive. Substrate 110 may be rigid or flexible. Substrate 110 may be optically opaque or transmissive. The substrate may be polymeric or any type of glass. For example, the substrate may be float glass, or it may be made of organic materials such as polycarbonate, acrylic, polyethylene terephthalate (PET), polyvinyl chloride (PVC), polysulfone, and the like. Substrate 110 may include a metal, in which case, the substrate can also be used as sensing electrode 120.

Self-supporting dielectric substrate 130 may be attached to sensor substrate 110 and cover layer 195 by, for example, an adhesive. Exemplary adhesives include UV curable adhesives, pressure sensitive adhesives, epoxies, urethanes, thiolenes, cyano acrylates, heat activated adhesives and thermoset adhesives.

Touch panel 201 can be flexible or rigid. A flexible touch panel 201 can, for example, conform to a curved display, such as a curved cathode ray tube (CRT) display. In one embodiment of the invention, flexible components are used to make a rigid touch panel 201.

Auxiliary electrodes 150 can be optically transmissive or opaque. Electrodes 150 can be formed using a conductive ink such as, for example, a thermally cured silver epoxy, or an electrically conducting composition containing an electrical conductor and glass frit where the conductor can be, for example, silver, gold, palladium, carbon or an alloy composition. Electrodes 150 can be deposited onto self-supporting dielectric substrate 130 by, for example, screen-printing, ink-jet printing, pad-printing, direct write or decal transfer.

Touch sensor 100 or 200 can further include optional linearization pattern 125 to linearize the electric field. Typically, the linearizing electrode pattern 125 includes several rows of discrete conductive segments 126 positioned along the perimeter of the touch sensitive area, such as disclosed in U.S. Pat. Nos. 4,198,539; 4,293,734; and 4,371,746 . Conductive segments 126 are typically electrically connected to each other via sensing electrode 120. U.S. Pat. No. 4,822,957 discloses rows of discrete electrodes having varying lengths and spacings to linearize the electric field in a touch sensitive area. Touch sensor 200 may further include additional electrically conductive segments (not shown in FIG. 2) to further electrically connect linearization pattern 125 to auxiliary electrodes 150.

Cover layer 195 can be flexible or rigid. Cover layer 195 can be self-supporting. Cover layer 195 can be made of glass or plastic.

The top and/or bottom surface of cover layer 195 can be smooth or structured. The structure can, for example, be random or include a regular pattern. For example, a surface can have a random matte finish. The surface can have one or two-dimensional microstructures. A structured surface can reduce glare. A structured top surface can also reduce the possibility of slippage when, for example, a touch implement is applied to the glass layer. A structured surface may also reduce the visibility of fingerprints on the touch surface.

Touch sensor 200 can further include other optional layers. For example, touch sensor 200 can include an anti-reflection (AR) coating disposed onto cover layer 195 to reduce specular reflection. The top surface of AR coating may be matte to further reduce specular reflection and slippage. The AR coating can be a multilayer film. The multilayer film can, for example, include alternate layers having high and low indices of refraction. Other optional layers that can be incorporated in touch panel 201 include polarizers, neutral density filters, color filters, compensation films, retarders, optical diffusers and privacy films.

Touch sensor 200 can further include optional layers to protect the sensing electrode 120 from other layers in the touch sensor. For example, an optional hard coat or barrier layer can be disposed on sensing electrode 120 to protect the sensing electrode from potential damage. One such potential damage may be from the acidic nature of an adhesive, used to attach dielectric substrate 130 to sensor substrate 110, that could potentially attack and degrade the performance of sensing electrode 120.

In general, any controller that is capable of generating a sufficiently large signal to noise ratio may be used with the present invention.

According to one aspect of the present invention, touch sensor 200 can be capable of detecting two or more distinct touch locations within the touch sensitive area 140. For example, touch sensor 200 is capable of detecting distinct touch locations A, B, C, and X in the touch sensitive area 140.

For ease of illustration and without loss of generality, FIG. 2 shows a linearizing electrode pattern 125 having a single row of electrically conductive segments 126 along the perimeter of the touch sensitive area 140, although, in general, the linearizing electrode pattern 125 can include several rows of such conductive segments.

According to the exemplary embodiment of FIG. 2, auxiliary electrodes 150 terminate near the four corners of the touch sensitive area 140. In general, auxiliary electrodes 150 can terminate at various locations along the perimeter of the touch sensitive area. Furthermore, in general, a touch signal, generated in response to an applied touch, is sensed, picked-up or transmitted from a plurality of locations on sensing electrode 120.

According to one aspect of the invention, touch applicator 190 can be coupled to touch sensor 200, for example, via electronics 199. The coupling can be resistive, for example, by a direct electrical connection, or capacitive. A direct electrical connection can help reduce background noise, thereby increasing the signal-to-noise ratio.

Figure 3:
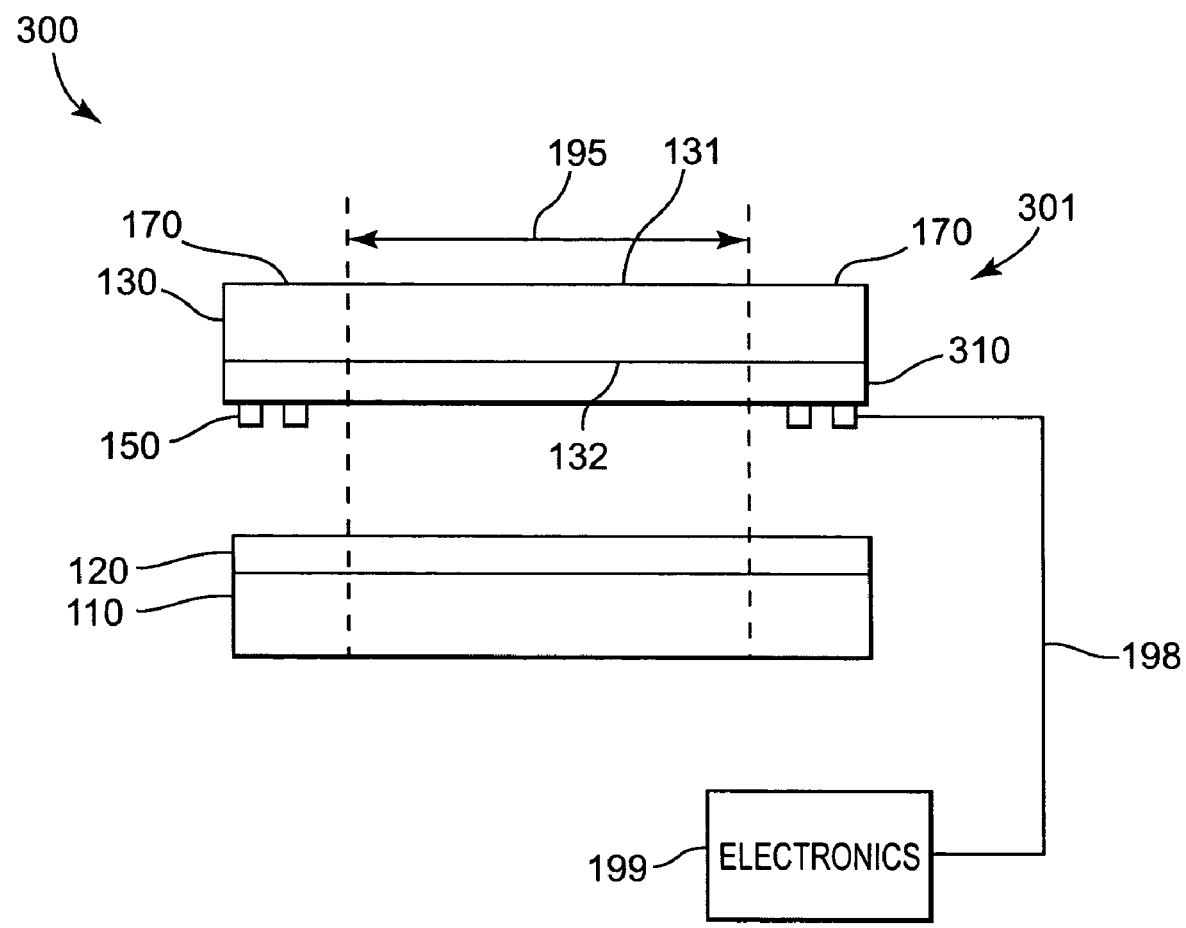
FIG. 3 illustrates a schematic side view of a touch sensor in accordance with yet another embodiment of the invention.

FIG. 3 illustrates a schematic side-view of a resistive touch sensor 300 in accordance with one particular aspect of the invention. For ease of illustration and without loss of generality, some of the layers and components shown in FIG. 1 and FIG. 2 are not reproduced in FIG. 3. Touch sensor 300 includes a touch panel 301, external electrodes 198 and electronics 199. Touch panel 301 includes a sensor substrate 110 covering a touch sensitive area 195, a first sensing electrode 120 disposed on sensor substrate 110 in the touch sensitive area, self-supporting dielectric substrate 130 facing the sensor substrate 110 and covering a border area 170, and a second sensing electrode 310 disposed on self-supporting dielectric substrate 130 in the touch sensitive area 195. Touch panel 301 further includes a plurality of auxiliary electrodes 150 disposed on self-supporting dielectric substrate 130 within the border area 170.

According to one embodiment of the invention, a touch input applied to the touch sensor 300 in the touch sensitive area 195 brings otherwise separated first and second sensing electrodes into physical contact with one another at the touch location, thereby generating a touch signal. Auxiliary electrodes 150 transmit the generated touch signal to electronics 199 via external electrodes 198. Electronics 199 uses the transmitted touch signal to determine the touch location.

Resistive touch sensor 300 can be a 4-wire, 5-wire, or 8-wire resistive touch sensor. Touch panel 301 can further have additional electrically conductive electrodes (not shown in FIG. 3) for linearizing the field or, in general, making electrical connections.

FIG. 3 shows a plurality of auxiliary electrodes 150 disposed on second sensing electrode 310. Auxiliary electrodes 150 can be disposed between second sensing electrode 310 and self-supporting dielectric substrate 130. In general, a portion of auxiliary electrodes 150 may be disposed on the first side 131 of the dielectric substrate 130 and another portion of auxiliary electrodes 150 may be disposed on the second side 132 of the dielectric substrate 130.

Auxiliary electrodes 150, as shown in FIGS. 1-3, may be connected to a sensing electrode using any suitable method employed in such general fields as electronics and interconnects. Exemplary methods, in accordance with the present invention, are illustrated in FIGS. 4 and 5.

Figure 4:
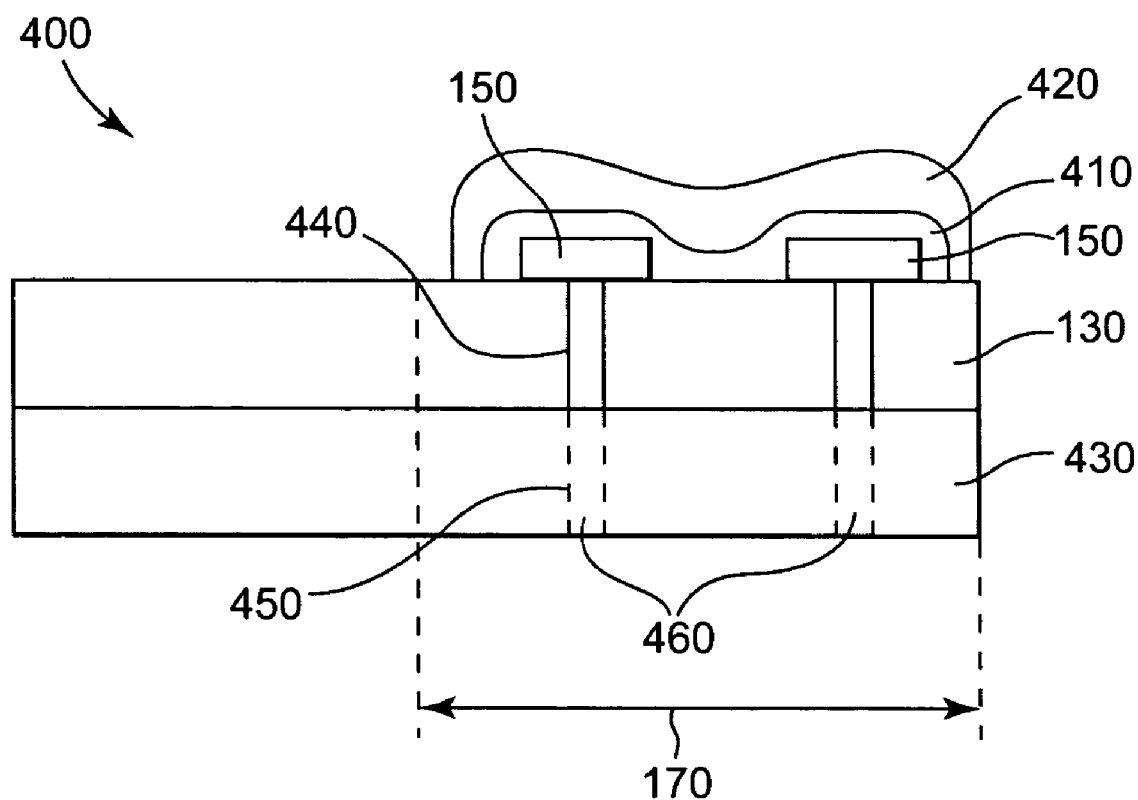
FIG. 4 illustrates a schematic side view of a portion of a touch sensor in accordance with another embodiment of the invention.
Figure 5:
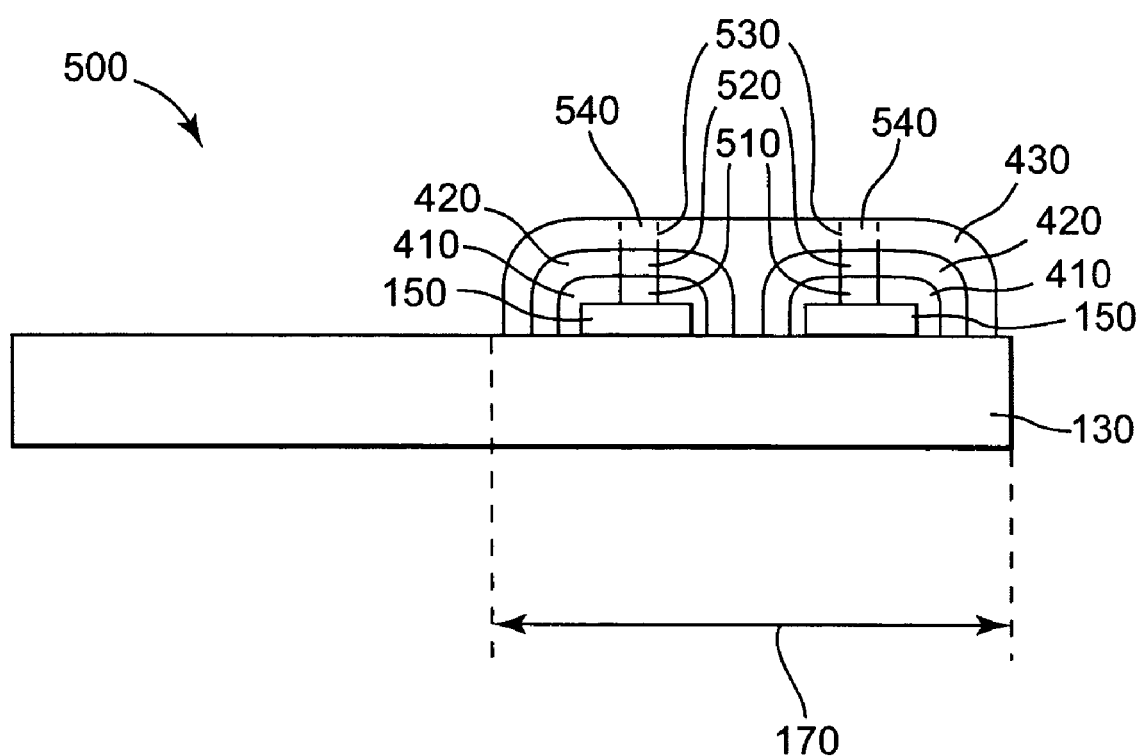
FIG. 5 illustrates a schematic side view of a portion of a touch sensor in accordance with another embodiment of the invention.

FIG. 4 illustrates a schematic side-view of a portion of a touch sensor 400 according to one embodiment of the present invention. Touch sensor 400 includes a self-supporting dielectric substrate 130, a plurality of auxiliary electrodes 150 disposed on the self-supporting dielectric substrate 130 in a border area 170, a protective layer 410 disposed on auxiliary electrodes 150, and an electrically shield layer 420 disposed on the protective layer 410. Touch sensor 400 further includes an adhesive layer 430 disposed on the self-supporting dielectric substrate 130, opposite auxiliary electrodes 150, for attaching dielectric substrate 130 to, for example, a sensing electrode (not shown in FIG. 4). Touch sensor 400 further includes a first vias 440 and a second vias 450. First vias 440 are formed in self-supporting dielectric substrate 130, and second vias 450 are formed in adhesive layer 430. Vias 440 and 450 are used to make electrical connection between auxiliary electrodes 150 and a sensing electrode (not shown in FIG. 4). Vias 440 and 450 can be filled with an electrically conductive material 460 to electrically connect a sensing electrode to auxiliary electrodes 150. Such a stacked arrangement can reduce the border. This aspect of the present invention can be particularly useful in applications where it may be desirable to integrate a touch sensor with a small border display device.

Vias 440 and 450 can be formed by, for example, punching, die cutting, laser ablation, knife cutting or chemical etching. Conductive material 460 can, for example, be a conductive paste, such as a silver conductive paste, a gold conductive paste, a palladium conductive paste, or a carbon conductive paste.

Adhesive layer 430 can be a UV curable adhesive, a pressure sensitive adhesive, an epoxy, a urethane, a thiolene, a cyano acrylate, a heat activated adhesive, a thermoset adhesive, or any other adhesive that may be suitable for attaching self-supporting dielectric layer 130 to a sensing electrode.

Protective layer 410 is preferably an electrically insulating layer and can generally be used to protect auxiliary electrodes 150 from damage that may occur, for example, during processing. Materials suitable for use in protective layer 410 include adhesives, polyimide covercoat systems (photoimagable or printed) and solder resists.

Shield layer 420 preferably has high electrical conductivity and is generally designed to protect auxiliary electrodes 150 from electrical interference, such as electrical noise interference. Shield layer 420 is preferably electrically isolated from auxiliary electrodes 150. Protective layer 410 can be used to isolate shield layer 420 from auxiliary electrodes 150, although other layers, not shown in FIG. 4, can be used to assist with the electrical isolation. Shield layer 420 can be metal. Metallic materials suitable for use in shield layer 420 include gold, copper, and silver.

It will be appreciated that although FIG. 4 shows a protective layer 410 and a shield layer 420 limited to a border area 170, in general, one or both layers can extend outside the border area, for example, into a touch sensitive area. Furthermore, although FIG. 4 shows both layers continuously covering discrete auxiliary electrodes 150, it will be appreciated that discrete protective layers 410 and/or discrete shield layers 420 can be used to cover the discrete auxiliary electrodes 150 as shown in FIG. 5.

FIG. 4 shows adhesive layer 430 extending outside border area 170. In general, adhesive layer 430 may be disposed on the dielectric substrate 130 in a border area and a touch sensitive area. In some applications or designs, for example, where substrate 130 has an open area that corresponds to a touch sensitive area, adhesive layer 430 may be limited to a border area.

FIG. 5 illustrates a schematic side-view of a portion of a touch sensor 500 in accordance with another embodiment of the present invention. Touch sensor 500 includes a self-supporting dielectric substrate 130, a plurality of auxiliary electrodes 150 disposed on the self-supporting dielectric substrate 130 in a border area 170, a protective layer 410 disposed on auxiliary electrodes 150, and an electrically shield layer 420 disposed on the protective layer 410. Touch sensor 500 further includes an adhesive layer 430 disposed on the self-supporting dielectric substrate 130, on the same side as auxiliary electrodes 150, for attaching the self-supporting dielectric substrate to, for example, a sensing electrode (not shown in FIG. 5). Touch sensor 500 further includes a first vias 510 formed in protective layer 410, a second vias 520 formed in shield layer 420, and a third vias 530 formed in adhesive layer 430. Vias 510, 520, and 530 can be used to make electrical connection between auxiliary electrodes 150 and a sensing electrode (not shown in FIG. 5).

Figure 6:
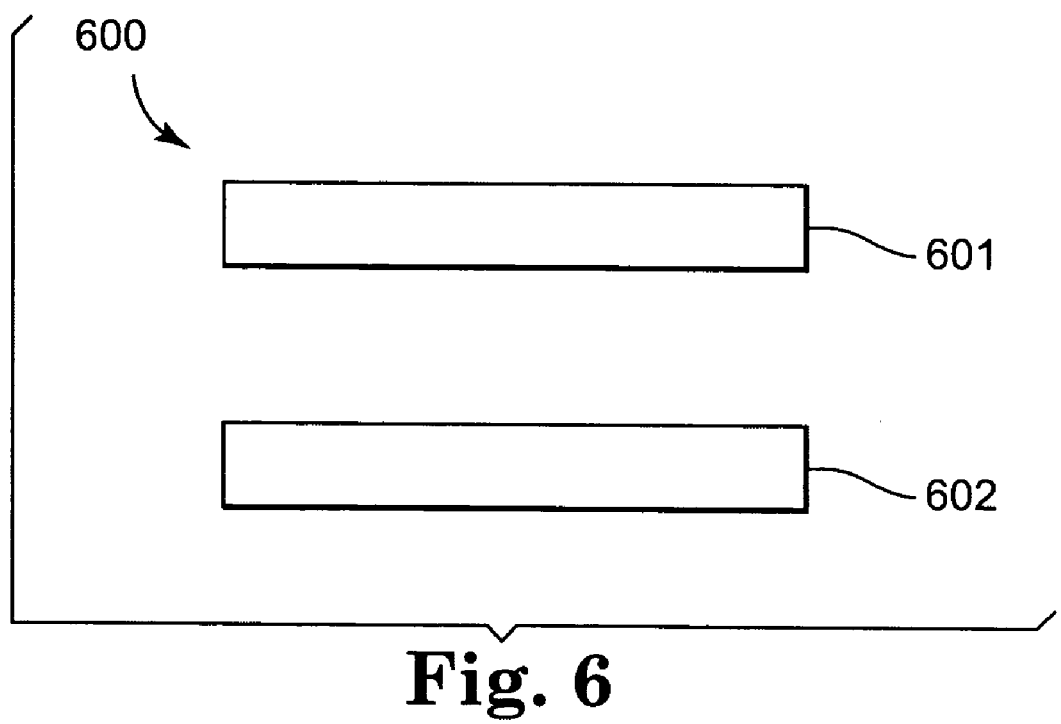
FIG. 6 illustrates a schematic side view of a display system in accordance with another embodiment of the invention.

FIG. 6 illustrates a schematic cross-section of a touch sensor system 600 in accordance with one aspect of the present invention. Display system 600 includes a touch sensor 601 and a display 602. Display 602 can be viewable through touch sensor 601. Touch sensor 601 can be a touch sensor according to any embodiment of the present invention. Display 602 can include permanent or replaceable graphics (for example, pictures, maps, icons, and the like) as well as electronic displays such as liquid crystal displays (LCD), cathode ray tubes (CRT), plasma displays, electroluminescent displays, OLEDs, electrophoretic displays, and the like. It will be appreciated that although in FIG. 6 display 602 and touch sensor 601 are shown as two separate components, the two can be integrated into a single unit. For example, touch sensor 601 can be laminated to display 602. Alternatively, touch sensor 601 can be an integral part of display 602.

Figure 7:
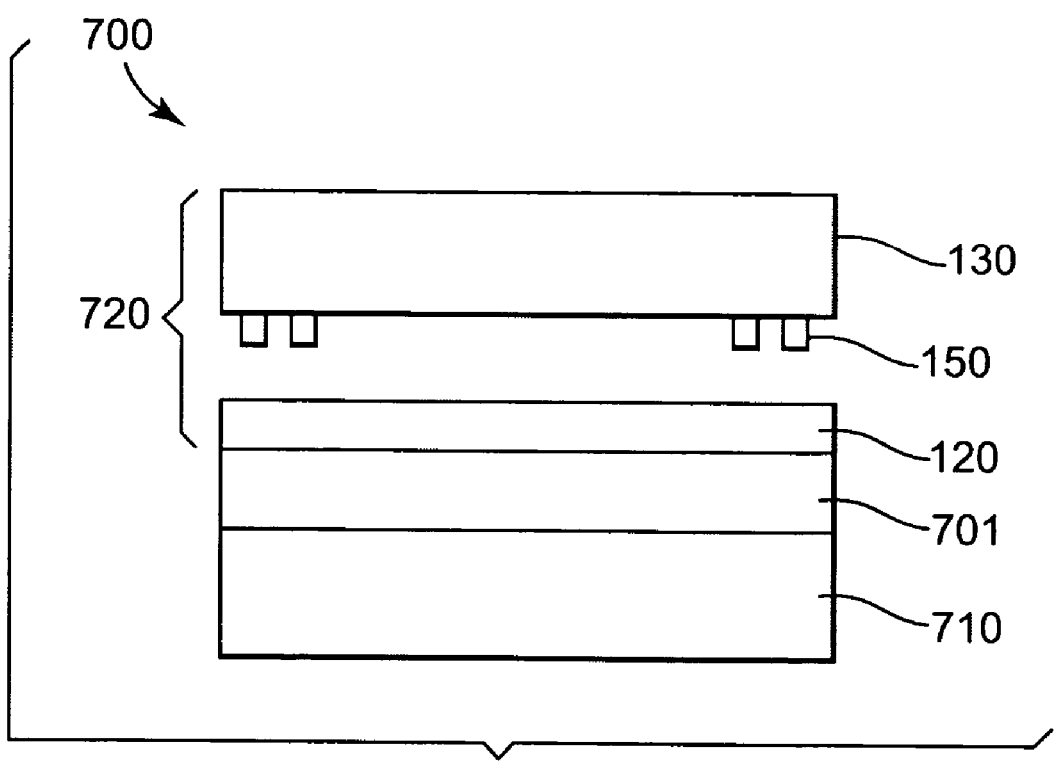
FIG. 7 illustrates a schematic side view of a touch display in accordance with another embodiment of the invention.

FIG. 7 illustrates a schematic cross-section of an exemplary touch display system 700 where a touch sensor 720 is integrated with a display device according to one particular aspect of the present invention. FIG. 7 shows a display substrate 710, an active display component 701, and a touch sensor 720. Touch sensor 720 can be a touch sensor according to any aspect of the present invention. Touch sensor 720 includes a sensing electrode 120, a self-supporting dielectric substrate 130, and a plurality of auxiliary electrodes 150 disposed on the dielectric substrate 130. Substrate 710 can serve as a substrate for touch sensor 720. Active component 701 can, for example, include all the components that may be used in a display system. For example, component 701 can include the active layers and parts typically used in an LCD display including a liquid crystal cell, polarizers, retarders, backlight, color filters, and the like. Display component 701 may be viewable through touch sensor 720. A touch input applied to a flexible glass layer 130 in a touch sensitive area can induce a touch signal. The touch location may be determined by detecting the induced touch signal.

All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. A touch sensor comprising:
   a sensor substrate covering a touch sensitive area, the touch sensitive area configured to receive a touch input applied to the touch sensitive area from a front side of the touch sensor;
   a sensing electrode disposed on the sensor substrate in the touch sensitive area;
   a self-supporting dielectric substrate covering a border area, the border area being outside the touch sensitive area the dielectric substrate being disposed between the sensing electrode and the front side of the touch sensor; and
   a plurality of auxiliary electrodes disposed on the self-supporting dielectric substrate in the border area, the auxiliary electrodes being capacity coupled to the sensing electrode, the touch sensor generating a touch signal in the sensing electrode in response to the touch input applied to the touch sensitive area front the front side of the touch sensor, the auxiliary electrodes transmitting the touch signal to electronics configured to use the touch signal to determine the touch location.

2. The touch sensor of claim 1, wherein a portion or the plurality of auxiliary electrodes is disposed on a first side of the self-supporting dielectric substrate and another portion of the auxiliary electrodes is disposed on a second side of the self-supporting dielectric substrate.

3. The touch sensor of claim 1, further comprising a field linearization pattern disposed along the perimeter of the touch sensitive area.

4. The touch sensor of claim 1, further comprising a cover layer disposed on the self-supporting dielectric substrate.

5. The touch sensor of claim 4, wherein the cover layer comprises glass.

6. The touch sensor of claim 4, wherein the cover layer is self-supporting.

7. The touch sensor of claim 4, wherein the flexible.

8. The touch sensor of claim 4, wherein the cover layer is rigid.

9. The touch sensor of claim 1 wherein the self-sporting dielectric substrate comprises glass.

10. The touch sensor of claim 1, wherein the self-supporting dielectric substrate is flexible.

11. The touch sensor of claim 1, wherein the self-supporting dielectric substrate comprises one or more apertures.

12. The touch sensor of claim 11, wherein the one or more apertures extend across the touch sensitive area.

13. The touch sensor of claim 11, wherein the one or more apertures are covered by the touch sensitive area.

14. The touch sensor of claim 1, wherein the sensing electrode comprises a metal oxide.

15. The touch sensor of claim 14, wherein the metal oxide comprises Indium Tin Oxide.

16. The vouch sensor of claim 14, wherein the metal oxide comprises Tin Antimony Oxide.

17. The touch sensor of claim 14, wherein the metal oxide comprises fluorine doped tin oxide.

18. The touch sensor of claim 1, wherein the sensing electrode comprises an organic conductor.

19. The touch sensor of claim 18, wherein the organic conductor comprises a conductive polymer.

20. A touch sensor system comprising a display viewable through the touch sensor of claim 1.

21. The touch sensor of claim 1 configured to be a capacitive touch sensor.

22. The touch sensor of claim 1 further comprising an electrically insulating layer disposed on the auxiliary electrodes.

23. The touch sensor of claim 22, further comprising an electrically conductive layer disposed on the electrically insulating layer.

24. The touch sensor of claim 23, wherein the electrically conductive layer is electrically isolated from the auxiliary electrodes.

25. The touch sensor of claim 1, further comprising an electrically conductive shielding electrode disposed on the sensor substrate and opposite the sensing electrode.

26. The touch sensor of claim 25, wherein one or more of the plurality of auxiliary electrodes are electrically connected to the electrically conductive shielding electrode.

27. The touch sensor of claim 1, wherein the self supporting dielectric substrate has one or more protruding sections.

28. The touch sensor of claim 27, wherein the one or more protruding sections electrically connect one or more of the plurality of auxiliary electrodes to the electronics.

29. The touch sensor of claim 25 or 27, wherein the one or more protruding sections electrically connect one or more of the plurality of auxiliary electrodes to the electrically conductive shielding electrode.

30. A capacitive, touch sensor comprising:
a sensor substrate covering a touch sensitive area, the touch sensitive area configured to receive a touch input applied to the touch sensitive area;
a sensing electrode disposed on the sensor substrate in the touch sensitive area;
a self-supporting dielectric substrate covering a border area, the border area being outside the touch sensitive area; and
a plurality of auxiliary electrodes disposed on the dielectric substrate in the border area, the auxiliary electrodes being capacitively coupled to the sensing electrode, the touch sensor generating a touch signal in response to a capacitive coupling between the touch sensor and the touch input applied to the touch sensitive area, the auxiliary electrodes transmitting the touch signal to electronics configured to use the touch signal to determine the touch location.

31. The capacitive touch sensor of claim 30, wherein the self-supporting dielectric substrate comprises one or more apertures.

32. The capacitive touch sensor of claim 31, wherein the one or more apertures extend across the touch sensitive area.

33. The capacitive touch sensor of claim 31, wherein the one or more apertures are covered by the touch sensitive area.

34. The capacitive touch sensor of claim 30, further comprising an electrically insulating layer disposed on the auxiliary electrodes.

35. The capacitive touch sensor of claim 34, further comprising an electrically conductive layer disposed on the electrically insulating layer.

36. The touch sensor of claim 35, wherein the electrically conductive layer is electrically isolated from the auxiliary electrodes.

* * * * *

UNITED STATES PATENT AND TRADEMARK OFFICE
CERTIFICATE OF CORRECTION

PATENT NO. : 7,339,579 B2  Page 1 of 1
APPLICATION NO. : 10/736388
DATED : March 4, 2008
INVENTOR(S) : Paul J. Richter It is certified that error appears in the above-identified patent and that said Letters Patent is hereby corrected as shown below:

Column 5
Line 55, Delete "A2 ." and insert -- A2. --, therefor. (Consider Space)

Column 8
Line 66, Delete "4,371,746 ." and insert -- 4,371,746. --, therefor. (Consider Space)

Column 12
Line 56, In Claim 1, delete "area" and insert -- area, --, therefor.
Line 61, In Claim 1, delete "capacity" and insert -- capacitively --, therefor.
Line 64, In Claim 1, delete "front" and insert -- from --, therefor.

Column 13
Line 1, In Claim 2, delete "or" and insert -- of --, therefor.
Line 15, In Claim 7, after "the" insert -- cover layer is --.
Line 18, In Claim 9, delete "1" and insert -- 1, --, therefor.
Line 18, In Claim 9, delete "sporting" and insert -- supporting --, therefor.
Line 32, In Claim 16, delete "vouch" and insert -- touch --, therefor.
Line 44, In Claim 22, delete "1" and insert -- 1, --, therefor.

Column 14
Line 5, In Claim 27, delete "self supporting" and insert -- self-supporting --, therefor.
Line 15, In Claim 30, delete "capacitive," and insert --capacitive --, therefor.

Signed and Sealed this

Twenty-sixth Day of August, 2008

JON W. DUDAS
*Director of the United States Patent and Trademark Office*